(12) United States Patent
Bierschenk et al.

(10) Patent No.: US 10,759,556 B2
(45) Date of Patent: Sep. 1, 2020

(54) FLEXIBLE JAWS FOR VERTICAL FILL FORM AND SEAL APPARATUS AND METHODS OF USE

(71) Applicants: Frito-Lay North America, Inc., Plano, TX (US); Douglas Machine, Inc., Alexandria, MN (US)

(72) Inventors: Patrick Joseph Bierschenk, Dallas, TX (US); Frank Mathew Brenkus, McKinney, TX (US); Ronald M. Gust, Miltona, MN (US)

(73) Assignees: Frito-Lay North America, Inc., Plano, TX (US); Douglas Machine, Inc., Alexandria, MN (US)

( * ) Notice: Subject to any disclaimer, the term of this patent is extended or adjusted under 35 U.S.C. 154(b) by 518 days.

(21) Appl. No.: 15/386,888

(22) Filed: Dec. 21, 2016

(65) Prior Publication Data

US 2018/0170599 A1    Jun. 21, 2018

(51) Int. Cl.
*B65B 51/30* (2006.01)
*B65B 65/02* (2006.01)
(Continued)

(52) U.S. Cl.
CPC ............ *B65B 51/303* (2013.01); *B29C 65/22* (2013.01); *B29C 65/74* (2013.01);
(Continued)

(58) Field of Classification Search
CPC ........... B65B 9/20; B65B 9/207; B65B 9/213; B65B 51/14; B65B 51/26; B65B 51/30;
(Continued)

(56) References Cited

U.S. PATENT DOCUMENTS 3,668,815 A     6/1972  Henry
3,830,681 A  *  8/1974  Wilson ................ B29C 66/8122
                                           156/583.2
(Continued)

OTHER PUBLICATIONS

PCT International Search Report and Written Opinion for PCT/US2017/066446, dated Feb. 12, 2018 (10 pages).

*Primary Examiner* — Chelsea E Stinson
*Assistant Examiner* — Himchan Song
(74) *Attorney, Agent, or Firm* — Barnes & Thornburg LLP; G. Peter Nichols

(57) ABSTRACT

A vertical form fill and seal apparatus, for packaging particulates, includes a package sealing assembly that has opposed sealing jaws operatively coupled to each other by mechanical connection at a common pivot point. A first jaw actuator is mechanically coupled to the opposed sealing jaws to pivot the jaws in a controlled manner about the common pivot point. A second actuator is mechanically coupled to the package sealing assembly and is configured to impart controlled reciprocating motion to the package sealing assembly. A controller is configured to control the first actuator and to control the second actuator thereby causing the jaws to describe a preset locus of travel, allowing flexibility of type of bag being made without change-out of jaws. The packaging film may move continuously, or may optionally be controlled to move intermittently through the VFFS.

20 Claims, 7 Drawing Sheets

(51) Int. Cl.
  *B65B 9/207* (2012.01)
  *B29C 65/22* (2006.01)
  *B29C 65/00* (2006.01)
  *B65B 9/213* (2012.01)
  *B29C 65/74* (2006.01)
  *B29L 31/00* (2006.01)

(52) U.S. Cl.
  CPC ...... *B29C 66/1122* (2013.01); *B29C 66/4312* (2013.01); *B29C 66/8221* (2013.01); *B29C 66/8246* (2013.01); *B29C 66/83543* (2013.01); *B29C 66/849* (2013.01); *B29C 66/84121* (2013.01); *B29C 66/84123* (2013.01); *B65B 9/207* (2013.01); *B65B 9/213* (2013.01); *B65B 51/30* (2013.01); *B65B 51/306* (2013.01); *B65B 65/02* (2013.01); *B29L 2031/7128* (2013.01)

(58) Field of Classification Search
  CPC ..... B65B 51/303; B65B 51/306; B29C 66/22; B29C 66/74; B29C 66/1122; B29C 66/4312; B29C 66/8221; B29C 66/8246; B29C 66/83543; B29C 66/84121; B29C 66/84123; B29C 66/849; B29C 66/8324; B29C 66/83241
  USPC ........ 53/451, 551, 479, 374.3, 374.5, 374.6, 53/374.9
  See application file for complete search history.

(56) References Cited

U.S. PATENT DOCUMENTS

| | | | | |
|---|---|---|---|---|
| 5,279,098 A | * | 1/1994 | Fukuda | B65B 9/213 53/451 |
| 5,329,745 A | * | 7/1994 | Suga | B65B 9/067 53/450 |
| 5,540,035 A | * | 7/1996 | Plahm | B29C 66/49 53/451 |
| 6,138,442 A | * | 10/2000 | Howard | B65B 51/30 53/373.7 |
| 6,598,367 B2 | * | 7/2003 | Nakagawa | B29C 66/81419 53/75 |
| 6,640,519 B1 | * | 11/2003 | Goodwin | B65B 9/20 156/66 |
| 8,539,741 B2 | * | 9/2013 | Lubezny | B29C 65/02 53/451 |
| 9,309,014 B2 | * | 4/2016 | Rea | B65B 9/20 |
| 2001/0049920 A1 | | 12/2001 | Yamamoto | |
| 2003/0074865 A1 | * | 4/2003 | Nakagawa | B29C 66/1122 53/451 |
| 2003/0093971 A1 | * | 5/2003 | Terminella | B29C 66/8161 53/133.4 |
| 2010/0215813 A1 | * | 8/2010 | Peterson | B65B 9/213 426/106 |
| 2011/0107729 A1 | * | 5/2011 | Miyazaki | B29C 66/8246 53/562 |
| 2015/0121813 A1 | * | 5/2015 | Bierschenk | B65B 9/2042 53/451 |
| 2018/0243996 A1 | * | 8/2018 | Baltes | B29C 66/8224 |

* cited by examiner

FLEXIBLE JAWS FOR VERTICAL FILL FORM AND SEAL APPARATUS AND METHODS OF USE

BACKGROUND

1. Field of the Invention

The invention relates to the field of high speed particulate product packaging on vertical form fill and seal machines that package a received charge of particulates in a package formed on the machine, and more especially to the sealing jaws of these machines.

2. Description of the Related Art

Vertical fill form and seal machines ("VFFS machines") are commonly used to bag particulate products, including, but not limited to, snack foods that are particulate in nature. Particulate snack foods include, but not limited to, potato chips, corn chips, and extruded snack pieces of various shapes and sizes. These usually enter near the top end of the VFFS machine in measured charges and are each then sealed into a package that is formed on the machine, from packaging film, to contain the snack food charge. The packaging film is most commonly of a heat sealable polymeric composition. In the heat sealing process, there are several variables, but significant among these are the applied pressure of the jaws, the dwell time (i.e. the time that the pressure is applied) and the seal temperature. The seal temperature is generally determined by the packaging material. But, the applied pressure and the dwell time are parameters that an operator can manipulate.

In some VFFS machines the package film advances downward around a forming tube where the free ends of the film are sealed together along the side of the forming tube and sealed transversely by a sealing device as it travels below the forming tube. The partially formed bag having a sealed side and bottom end is then filled with the particulate charge and the top of the bag being formed is sealed with another transverse seal.

In some VFFS machines, the motion of the packaging film is halted intermittently as the film is being transversely sealed to form the bag. The step of heat sealing requires a finite amount of time to complete. Consequently, VFFS machines of this type are of intermittent operation.

In other VFFS machines, which are of continuous operation, there is a jaw assembly that has a pair of opposed jaws that are each mounted to a common rail so that they slide on the rail toward each other to close and thereby seal the film gripped between the jaws, and slide away from each other to an open position. In addition, the jaw assembly has a vertical rail along which the common rail (with its mounted opposed jaws) can slide up and down. Thus, during operation, the sealing elements on the faces of the opposed jaws move in a "box mode:" inward to pinch the packaging film between the jaws, and the downward, at the same speed as the traveling film, while still applying pinching pressure to form the transverse seal. The jaws separate outward away from the film once the seal is formed; and then move upward in position for again pinching inward to form the next seal. A point at the leading edge of each sealing element traces a locus ("path") that is a rectangle and that can be described as a "box." These box-mode jaws can form transverse seals while the film moves continuously. Box-mode jaw assemblies are relatively heavy but they can apply relatively high sealing pressure, and have relatively high seal dwell time. They can be used with large bags, such as large pillow bags. And, they are useful in making formatted bags, including but not limited to single sided gusseted bags, or double sided gusseted bags, or bags with a base shaped for standing upright for display. But, they are relatively slow in terms of bags made per minute.

In a variation of the box-mode jaws described above, the jaws may trace a D-shaped locus. These jaws are relatively faster than the box-mode, and can apply moderate seal dwell times, and moderate seal pressure. They are not as capable as the box-mode in terms of the variety of formatted bags that they are suited to making.

In yet other VFFS machines, there are fixedly positioned opposed rotary arms, one on each side of the packaging film. Each rotary arm carries a heat sealing element to form the transverse seal. These heat sealing elements are convex inboard, presenting an outward curved surface facing towards the packaging film. (By "inboard," we mean the side that would face the packaging film during operation of the sealing jaws.) Thus, as the rotary arms rotate, the heat sealing elements on each side rotate into positions where they register and urge against opposite sides of the packaging film as the arms rotate to create a transverse heat seal. The opposed sealing elements contact the film, during sealing, along the convex opposed surfaces to apply pressure and heat. Further, as the rotary arms rotate a point at the leading edge of each sealing element traces a locus that can be described as a circle. The VFFS machine is of continuous operation in that the packaging film advances without interruption as the transverse seal of the bag is formed. These jaws are able to operate continuously at high speed in terms of bags/minute. They are able to apply very high seal pressure, but for very short dwell times. Because of the structure of the rotary jaws, they are not well-suited to sealing large bags. And they are not suited to making formatted bags because they spatially interfere with the placement of formers. They are, by and large, limited to pillow bags.

In a variation of the rotary type of VFFS machine, the heat sealing elements are mounted to the rotary arms so that they are able to reticulate to a limited extent so that the faces of the sealing elements may be squarely aligned to each other during the formation of the seal.

SUMMARY

There is provided an exemplary embodiment of a vertical form fill and seal ("VFFS") apparatus, for packaging particulates, including but not limited to, snack foods. The VFFS includes a package sealing assembly having opposed sealing jaws operatively coupled to each other by mechanical connection at a common pivot point. It further includes a first actuator fixedly attached to a structural frame. The first actuator is mechanically coupled to the opposed sealing jaws to pivot the opposed sealing jaws in a controlled manner about the common pivot point to open and close the opposed sealing jaws. In addition, it includes a second actuator fixedly attached to a structural frame. The second actuator is mechanically coupled to the package sealing assembly and is configured to impart controlled up and down reciprocating motion to the package sealing assembly. A controller is configured to control the first actuator and to control the second actuator. The configurable controller controls opening and closing of the sealing jaws by the first actuator and controls the reciprocating motion by the second actuator. By controlling the jaws motions as well as the reciprocation, the controller causes a selected point on a leading edge of each (or either) of the jaws to describe a preset locus of travel. Thus, when in use, the first actuator operates the opposed sealing jaws to seal the package film with the particulates therein, while the sealing jaws follow the preset locus of travel. The packaging film may move continuously, or may optionally be controlled to move intermittently through the VFFS.

The first actuator may be driven by a servomotor controlled by the controller. Optionally, the second actuator may be driven by a servomotor controlled by the controller.

Both the first and second actuators may each be driven by (separate) servomotors controlled by the controller. Further optionally, the first actuator may be driven hydraulically or pneumatically under control of the controller; and likewise the second actuator may be driven hydraulically or pneumatically under control of the controller.

The first actuator may be mechanically coupled to one of the opposed sealing jaws above the common pivot point, and may be coupled to the other of the jaws at a point below the common pivot point such that the jaws move in unison to open and close when urged by the first actuator.

For each of the opposed jaws, points along the preset locus of the jaw comprises a vertical velocity vector and a horizontal velocity vector. The preset locus of travel of each of the opposed jaws may be a mirror image of the preset locus of travel of the other jaw.

The controller is configured to control both a velocity of the first actuator and a velocity of the second actuator, as well as an extent of displacement of the jaws through control of the first actuator and the second actuator.

The mass of the package sealing assembly may be supported on the structural frame only by attachment of the first and second actuator to the structural frame.

A laterally extending heat sealing bar may be fixedly mounted to each of the opposed faces of the opposed jaws to transversely seal a packaging film when the jaws close.

In a further embodiment, instead of using only one first actuator for operating each pair of opposed sealing jaws, an additional first actuator may be added. Thus the first actuator is mechanically coupled to and moves one of the opposed sealing jaws, while the additional first actuator is coupled to and moves the other of the opposed sealing jaws.

There is also provided an exemplary method of packaging a particulate product, such as a snack food, on a vertical form fill and seal apparatus. The method includes the steps of: providing a particulate snack food charge to the vertical form fill and seal apparatus for packaging; and feeding packaging film through the vertical form fill and seal apparatus. In addition, side-sealing the packaging film, while the film is in motion, with a longitudinal side seal. Moving an assembly, comprising sealing jaws of the vertical form fill and seal apparatus, in a vertical reciprocating motion; while moving the sealing jaws between open and closed positions under control of a controller, such that a point at an end of any of the jaws describes a locus predetermined by the controller. The method further includes transversely sealing the packaging film by pivoting the sealing jaws toward each other, about a common pivot, on opposite sides of packaging film. The step of feeding the film can be continuous, without interruption in the continuous feeding of the packaging film, or can be intermittent.

The step of moving an assembly may include moving the assembly such that both an extent and a velocity of up and down motion is under control of the controller. The step of moving an assembly may include moving such that both an extent and a velocity of the opening and closing of the opposed sealing jaws is under control of the controller.

The step of moving an assembly may include moving the assembly such that the point on the leading edge of each sealing jaw describes a locus that is a mirror image of a locus described by the other jaw.

The predetermined locus of a point at an end of any of the jaws may describe a circle having a radius predetermined by the controller, or a rectangle having a dimensions predetermined by the controller, or an ellipse having dimensions predetermined by the controller, or may have a D-shape.

BRIEF DESCRIPTION OF THE DRAWINGS

The foregoing aspects and many of the attendant advantages of the present technology will become more readily appreciated by reference to the following Detailed Description, when taken in conjunction with the accompanying simplified drawings of exemplary embodiments. The illustrative, schematic drawings, briefly described here below, are not to scale, are presented for ease of explanation and do not limit the scope of the inventions recited in the accompanying patent claims.

DETAILED DESCRIPTION

Figure 1:
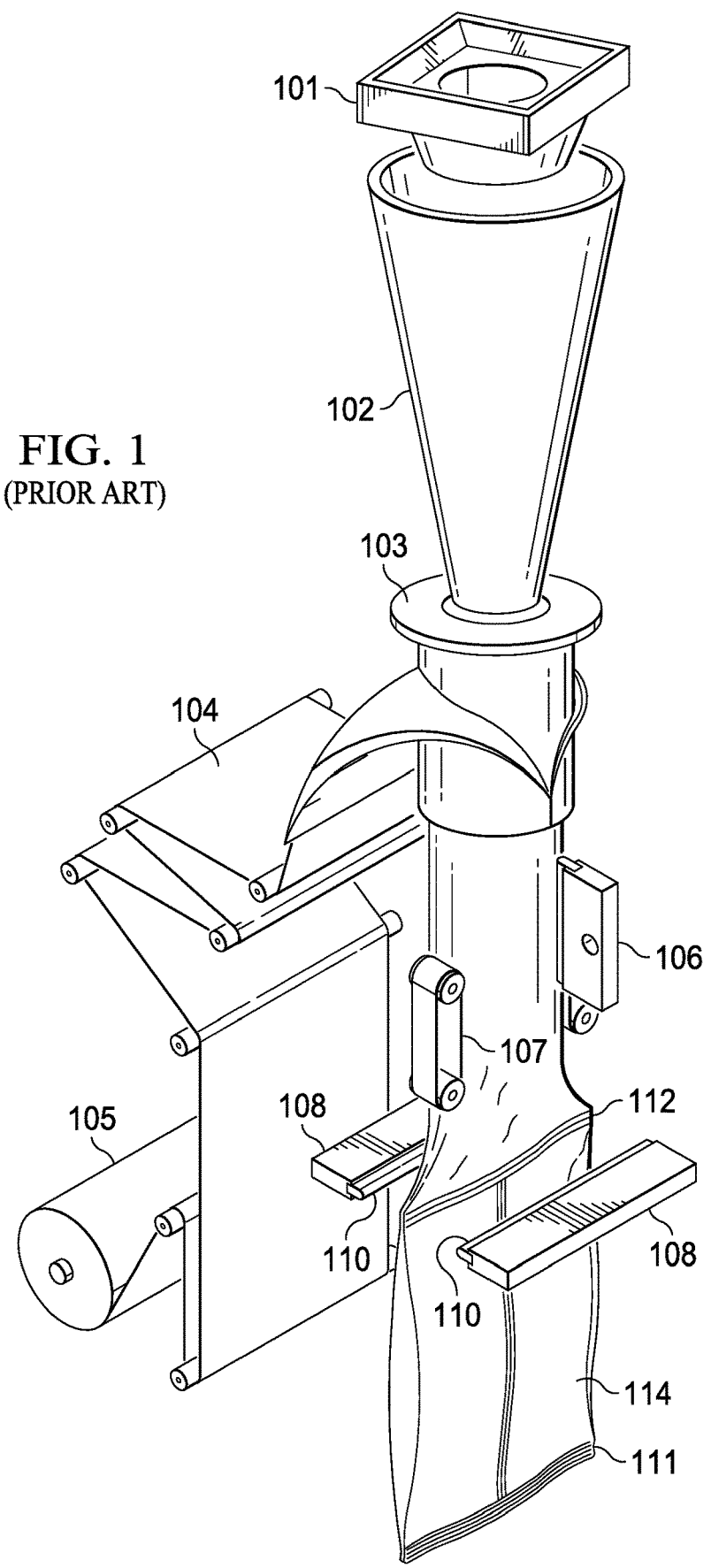
FIG. 1 is a schematic and exemplary depiction of a prior art vertical form, fill and seal apparatus for illustrative purposes, showing sealing jaws.

The following non-limiting detailed descriptions of examples of embodiments of the technology may refer to appended drawing Figures and are not limited to the drawings, which are merely presented for enhancing explanations of features of the technology. In addition, the detailed descriptions may refer to particular terms of art, some of which are defined herein, as appropriate and necessary for clarity.

As explained elsewhere here above, in vertical fill form and seal ("VFFS") apparatus the sealing jaws are typically limited to a single range and locus of motion. Rotary sealing jaws, for example, rotate so that a selected point on the leading edge that will interface with the packaging material to be sealed describes a locus that is circular and that is fixed by dimensions of the rotary arm structure. This is a necessary consequence of the structure of such jaws. Likewise, box-mode and D-shaped mode jaws each move the jaws in predetermined loci.

Each type of sealing jaws has certain limitations and is most suitable for use in sealing specific types of bags. These limitations are generally due to any of the following parameters: jaw type, jaw motion, sealing element, sealing pressure, dwell time for sealing, and spatial limitations, such as, for example, interfering spatially with other apparatus such as bag formers that must be inserted to make a formatted bag. Jaws that interfere spatially and obstruct such apparatus, necessary to make the formatted bags, clearly cannot be used to make such bags. A "formatted bag," as the term is used herein, refers to bag or package that is not of the common "pillow-type," which has a transverse seal at the top and another at the bottom, but that requires use of other apparatus, such as bag formers, to create additional features, including, but not limited to a single sided gusset or a double sided gusset, or a base formed and shaped for standing upright for display. Thus, while some types of sealing jaws such as rotary jaws are suitable for pillow bags, they must be replaced with other jaws if the VFFS apparatus must be used to make formatted bags. Thus, in practice, jaw type imposes limitations that constrain the range of bag types that can be sealed with a particular type of jaws, and/or that constrain the speed of package formation in bags/minute. Because packaging needs vary, there is either a bank of VFFS machines that are each dedicated to a different particular type of package, necessitating capital outlay, or the jaws of the machines must be changed out when there is demand to switch to another type of package, necessitating expensive machine down time.

A VFFS apparatus of the invention is equipped with "flexible sealing jaws" that would permit the sealing of pillow bags as well as any other kind of formatted bag, including but not limited to single gusseted, double gusseted, and flat bottom for upright display. This avoids the downtime in switching jaws, and avoids the need for dedicated machines. By "flexible sealing jaws" it is therefore meant that these jaws are configurable (under control of a controller) so that a defined point on a leading edge of the jaw travels in a locus ("path") such that during operation the jaws are not obstructive of other process apparatus, that may be necessary and that may be in proximity (in both time and space) to perform other operations, such that the jaws can seal a variety of formats of packages. The variety of formats include pillow bags as well as any other kind of formatted bag, including but not limited to, single gusseted, double gusseted, and flat bottom for upright display. Moreover the flexible sealing jaws operate continuously in the sense that the packaging film fed to the vertical fill and seal machine travels through the machine continuously without intermittent stopping on account of the sealing operation. If desired, however, the VFFS apparatus with the inventive flexible sealing jaws can also be operated with intermittent stopping, if needed for a particular purpose. Thus, the inventive VFFS apparatus with flexible sealing jaws have continuous or intermittent operation.

A context for a better understanding of the inventive flexible sealing jaws may be facilitated by referring to FIG. 1, depicting schematically a portion of a traditional VFFS apparatus. In sequence, from the top, there is a weigher 101, where particulates, for example particulate snack food to be packaged, are charged and weighed. The weigher 101 accumulates and discharges a specified charge of product corresponding to the amount of product which will occupy a single bag. Downstream from and below the weigher 101 is typically a funnel 102, or a series of funnels, which receives and then directs the charge of product. Downstream from the funnel 102 is a product delivery cylinder 103, which then receives the product charge. As used in a VFFS apparatus, the product delivery cylinder 103 is often referred to as a "former." The packaging film 104, dispensed from a roll 105, is draped around the former 103 and travels downward. A side sealer 106 seals the edges of the packaging film together to form a tube that continues to travel downward under urging from belt driven rollers (one partially obscured) 107 on opposed sides of the former 103 as the seal is formed. The sealing jaws 108 on either side of the packaging film 104 are each equipped on a leading face of the jaw with a heating element 110 that is moved inward to touch the film, and urge against the film, to form a transverse seal 111, and then retract away from the film 104. Once the transverse seal 111 is formed, the bottom of the tube of packaging film is closed. A charge of product is then delivered through the product delivery cylinder 103 and into the sealed tube. Thereafter, as the film 104 (now a partially formed bag having a sealed bottom and product therein) continues to move downward, the sealing jaws again move so that the heating elements contact and urge against the top region of the partially formed bag to form another transverse seal 112, and then retract away from the seal. Thus, there is formed a bag, sealed at top and bottom, with product therein. A blade may then cut the film above the top seal of the bag (and below the bottom seal of the next bag being formed in the process) to separate the bag from the film.

FIG. 1 is shown with generic transverse sealing jaws 108. Nonetheless, the drawing illustrates basic principles of operation of VFFS apparatus. The flexible sealing jaws of the present invention may be retrofitted to, or otherwise included in, a variety of VFFS apparatus, not limited to the one described for illustrative purposes in FIG. 1.

Figure 2:
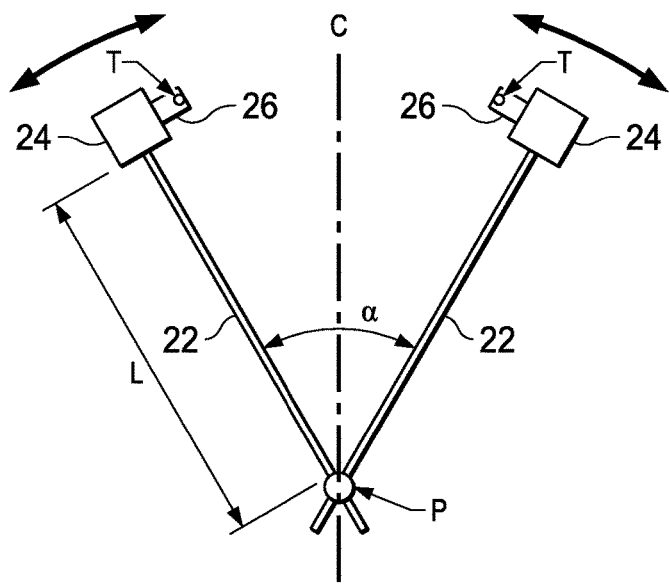
FIG. 2 is a schematic depicting an embodiment of a v-shaped sealing jaw assembly, with an enlarged detail depicting a heating strip on a jaw.

Turning now to aspects of the flexible sealing jaws of the present invention, FIG. 2 is a schematic shows a v-shaped opposed pair of jaws 24, each mounted at an end of a jaw pivot arm 22. The pivot arms 22 are mechanically coupled at a pivot point P. Jaws 24 each have a heating element 26 at a leading face so that these can move to contact and urge against opposed sides of a packaging film, and against each other, to create a transverse seal. As indicated by arrows, the jaws can pivot through an angle α relative to each other. Angle α can vary up to 180° or more, or might be constrained to an angle of less than 180°, as necessary and desirable. For a better understanding of the flexibility of the sealing jaws, as explained here below, a theoretical point T at a leading edge of the heating element 26 is useful in describing the locus of the jaws when in use. A length L extends from the pivot point P, along pivot arm 22, to the theoretical point T.

The term "actuator" as used herein refers to a mechanical coupling extending from a driver to the flexible sealing jaw assembly, or to a component of the flexible sealing jaw assembly, that is to be driven. Thus, the actuator may have several mechanical components including, but not limited to, a lever arm, or multiple lever arms, or rod and toggle arrangements operatively coupled together to effect controlled motion of the flexible sealing jaw assembly (or a component thereof) in response to motion of the driver. The term "actuator" also encompasses a driven belt-and-pulley arrangement that is operatively coupled to effect controlled motion of the flexible sealing jaw assembly (or a component thereof) as the driver imparts motion to the belt via a pulley.

Figure 3:
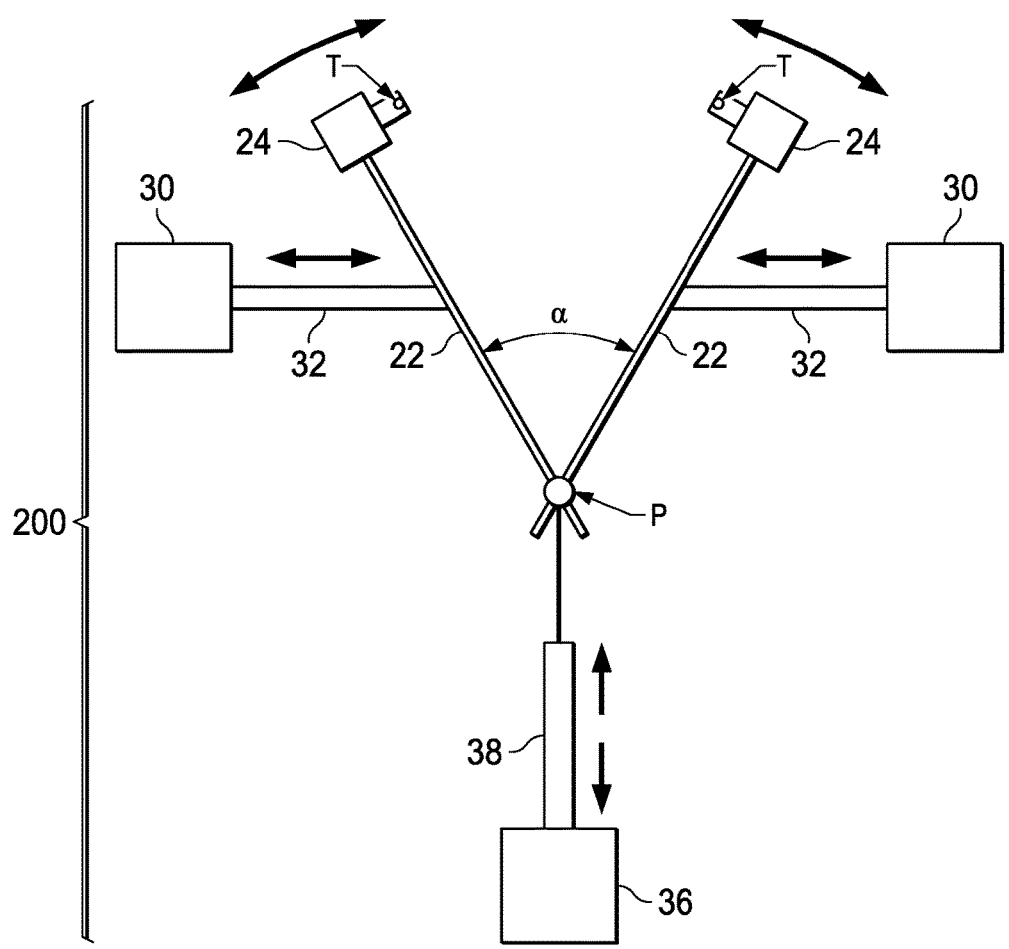
FIG. 3 is a schematic depiction of a v-shaped embodiment of a flexible sealing jaw assembly, according to the invention, depicting first and second actuators for controlled two-dimensional movement of the jaws.

Referring to FIG. 3, the schematic of an embodiment of the v-shaped pivoting flexible sealing jaw assembly 200 can be brought into motion through coupling to actuators. Thus, each arm is coupled to an actuator 32 that is driven by a driver 30 that is either a servomotor or a hydraulic or pneumatic driver. As explained here below, the drivers 30 of the actuators are controlled to act in concert with each other in opening and closing the sealing jaws 20. In addition, another actuator 38 is mechanically coupled to the v-shaped jaws at the pivot point P. This actuator 38 is also driven by a driver 36 that is either a servomotor or a hydraulic or pneumatic driver, that is controlled, as further explained here below. Accordingly, as indicated by the arrows, the entire flexible sealing jaw assembly 200 has flexibility to move in two dimensions: up and down motion ("vertical reciprocal") induced by actuator 38, and radial, and horizontal motion of the jaw pivot arms 22 induced by actuators 32, 32.

Figure 4:
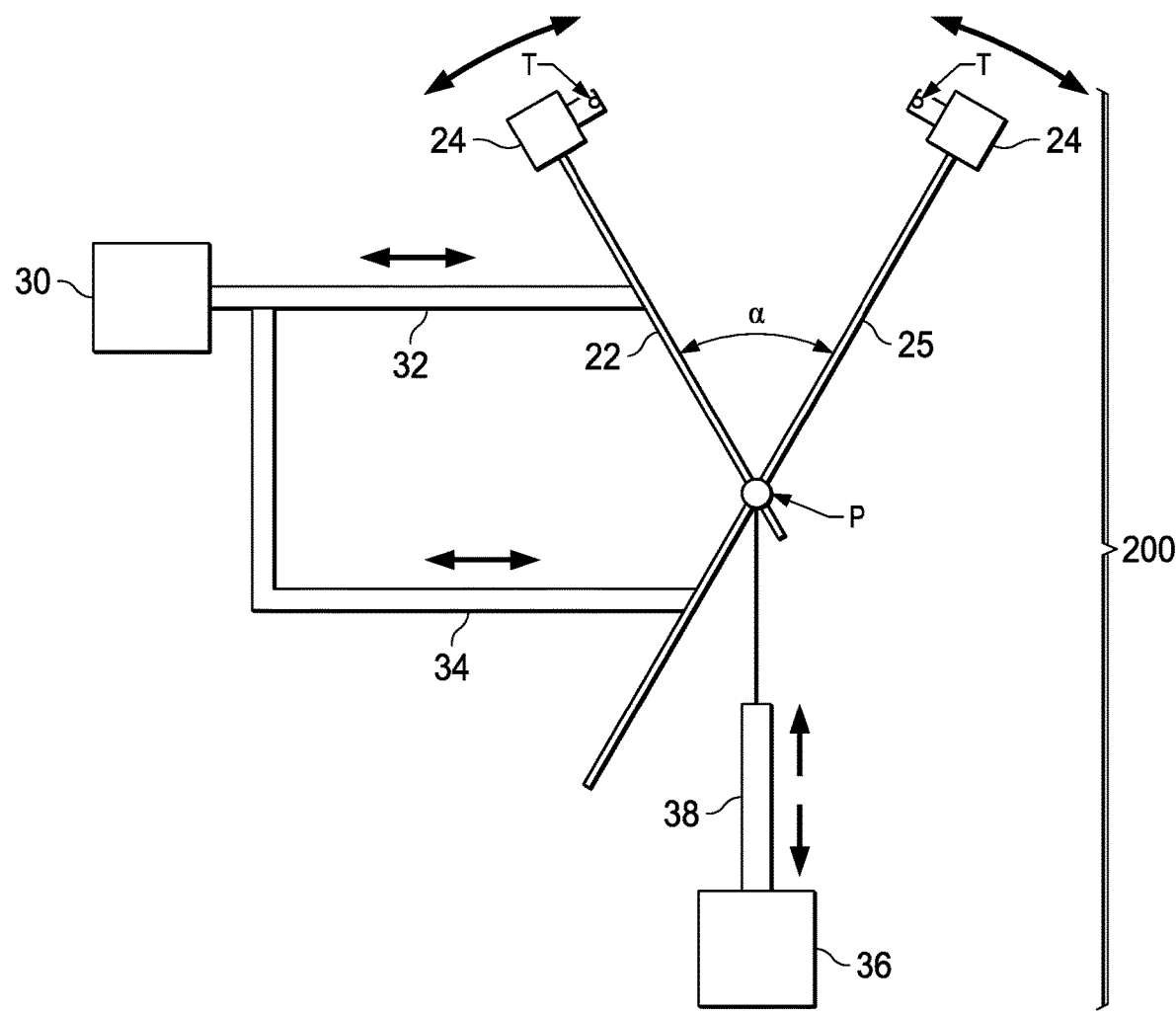
FIG. 4 is a schematic depiction of a y-shaped embodiment, according to the invention, of a flexible sealing jaw assembly depicting first and second actuators for controlled two-dimensional movement of the jaws.

Referring to FIG. 4, this depicts schematically an embodiment that requires only two actuators. In this instance, the flexible sealing jaws are y-shaped. Thus, the tow pivot arms are not identical; jaw pivot arm 25 is longer than jaw pivot arm 22. This allows a single actuator 32 with a coupled parallel branch 34 to mechanically couple to both pivot arms 22, 25, and move them in concert. As depicted, actuator 32 is coupled to jaw pivot arm 25 above the pivot point P, while the branch is coupled to pivot arm 25, below the pivot point P. As indicated by the arrows, the entire flexible sealing jaw assembly 200 has flexibility to move in two dimensions: up and down motion ("vertical reciprocal") induced by actuator 38, and radial, and horizontal motion of the jaw pivot arms 22 induced by actuator 32. An actuator 32 is also driven by a driver 30 that is either a servomotor or a hydraulic or pneumatic driver.

In both FIGS. 3 and 4, in considering the locus described by point T, it will be appreciated that at any specific location of point T, it has a vertical velocity vector as well as a horizontal velocity vector. These velocity vectors, which control the locus of point T, are controlled by the controller, which drives the actuators, and thereby controls the locus that will be described by point T. Accordingly, a controller can be configured for a variety of loci, and each of these preset loci can be accessed and activated by an operator to allow an immediate transition from one locus to another that is more suitable for the format of packaging that must be made next on the VFFS. Thus, there is minimal if any machine downtime.

Figure 5:
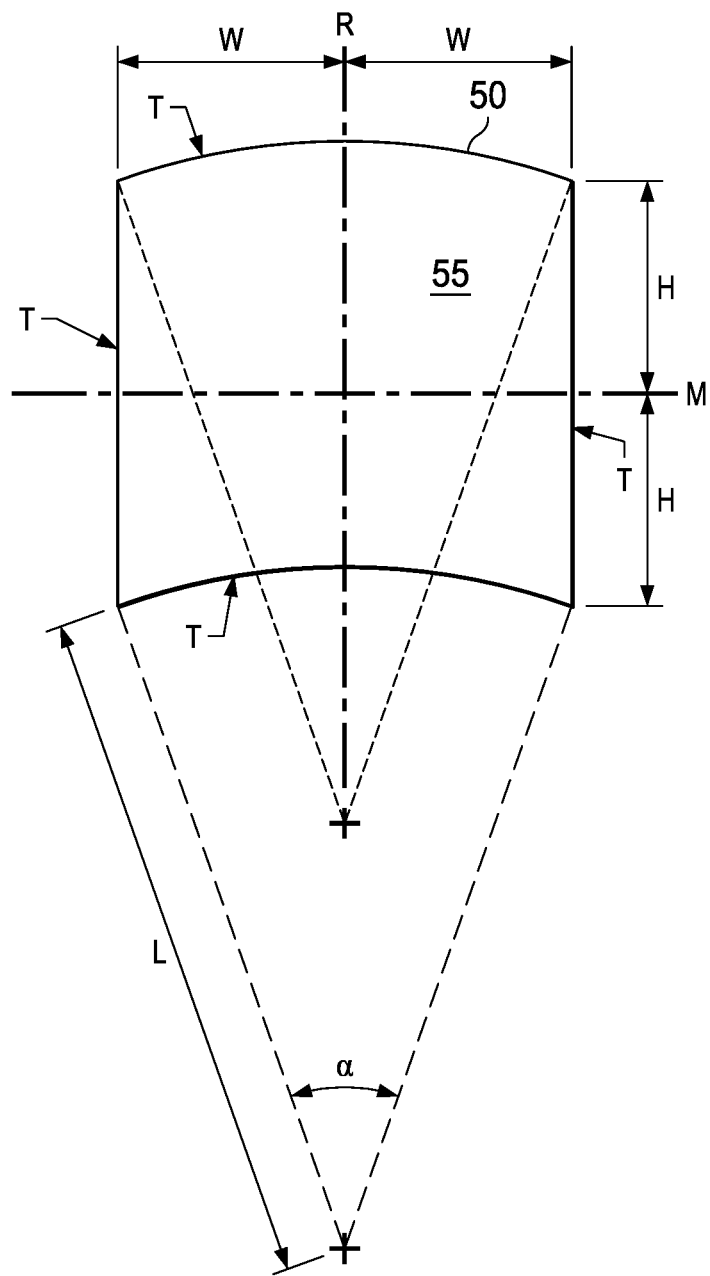
FIG. 5 is a schematic diagram showing an envelope of the range of motion of the flexible jaws, according to the invention, within dimensional parameters of the apparatus

FIG. 5 illustrates an envelope 50 formed by the maximum travel of the vertical actuator vertically up and down, and the maximum width defined by the opening of the flexible sealing jaws to a maximum angle α of 180°. The sealing jaws, as described in FIGS. 2-4 have a pivot point P that moves up a displacement H from a central point on its range of travel and down by a displacement H. Thus, the height of the envelope 50 is 2H. The pivot arms each have a length L, and as the flexible sealing jaws open and close, they describe a locus of an arc, shown connecting the two sides of envelope 50 at the top and bottom. Thus, the dimensional parameters of the maximum range of motion through which the actuators (vertical and horizontal) travel define the outer limits to which point T can travel, and thereby define the envelope 50, having a space 55 therein, within which point T can range. As pointed out above, the controller is configured to control the extent of motion (displacement) and velocity of the actuators and as a result it controls the locus that theoretical point T on the leading edge of the flexible sealing jaws follows during the sealing operation.

Figure 6A:
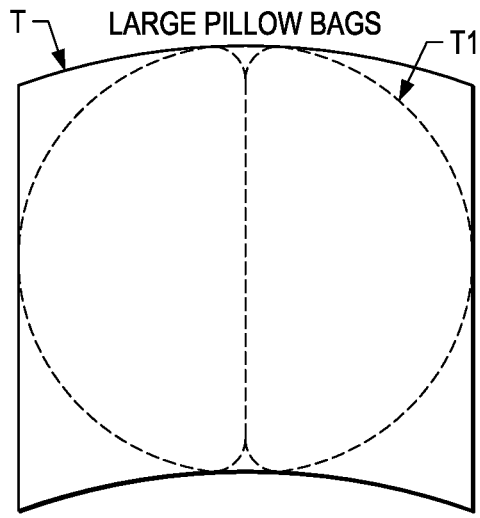
FIG. 6A is a schematic depicting an example of a locus of motion of the flexible jaws according to the invention, within the envelope of FIG. 5.
Figure 6B:
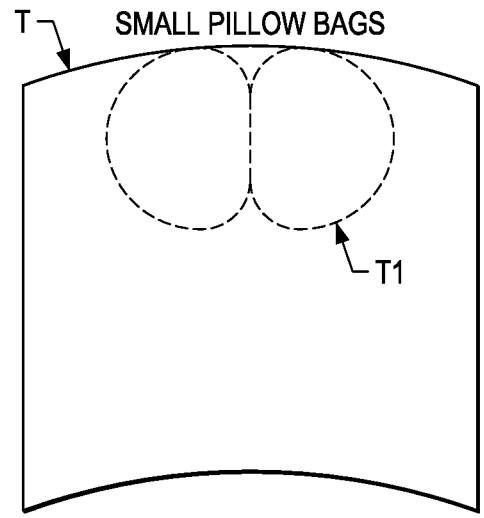
FIG. 6B is a schematic depicting an example of the locus of motion of the flexible jaws according to the invention, within the envelope of FIG. 5.

The controller can be configured with a range of preset loci for T based on the format of bags to be formed, and the desired spatial location of the flexible sealing jaws at any point in time during the jaws' sealing operational cycle. Thus, for example, in making a large pillow bag, as illustrated in FIG. 6A, the theoretical point T1 on the leading edge of the flexible leading jaws follows the locus shown in broken lines, for each jaw. The point T1 on each of the jaws moves toward the packaging film (not shown to avoid confusion, but coincident with the vertical center line), touches opposite sides of the packaging film, and urges against it while moving downward at the same velocity as the film travels through the VFFS, to form the transverse seal. This forms a D-shaped locus. In contrast, when small pillow bags are required, the controller is set to provide the T1 locus illustrated in FIG. 6B. This is achieved by controlled movement of the actuators controlling horizontal and vertical jaw displacement, and without changing the sealing jaws or otherwise making mechanical alteration. In this regard, the sealing jaws of the inventions herein are flexible.

Figure 6C:
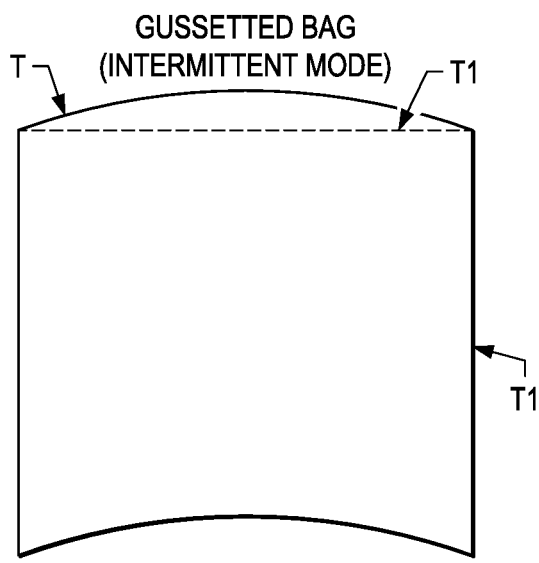
FIG. 6C is a schematic depicting another example of the locus of motion of the flexible jaws, within the envelope of FIG. 5.
Figure 6D:
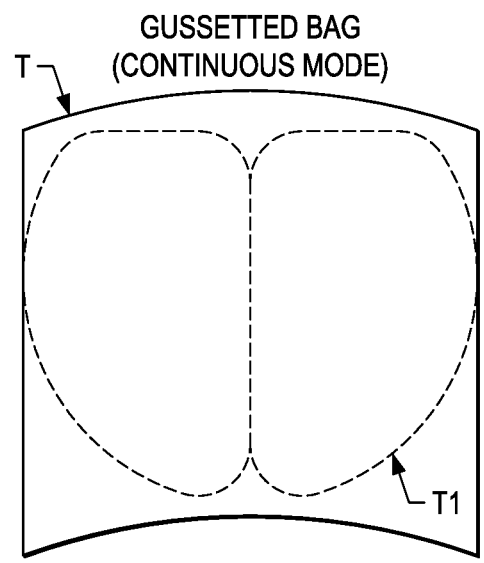
FIG. 6D is a schematic depicting another example of the locus of motion of the flexible jaws within, the envelope of FIG. 5.

According to FIG. 6C, if a gusseted bag is to be made, it may be necessary for the sealing jaws during the cycle to move out of the path of apparatus used to form the gusset. Thus, the sealing jaws may be controlled such that the locus T1 closely tracks the envelope 50. FIG. 6C illustrates an example of a box-mode locus T1 that may be used when a gusseted bag is made in an intermittent mode of operation, where packaging film may intermittently stop as sealing takes place. FIG. 6D illustrates an example of the substantially D-shaped mode of locus T1 when a gusseted bag is made in a continuous mode of operation, where packaging film does not intermittently stop as sealing takes place.

For other types of packages, another of the preset loci could be selected, limited only by the envelope 50 and the needs and imagination of the user. This flexibility of using the same sealing jaws with a range of preset loci is therefore a significant advantage.

Figure 7:
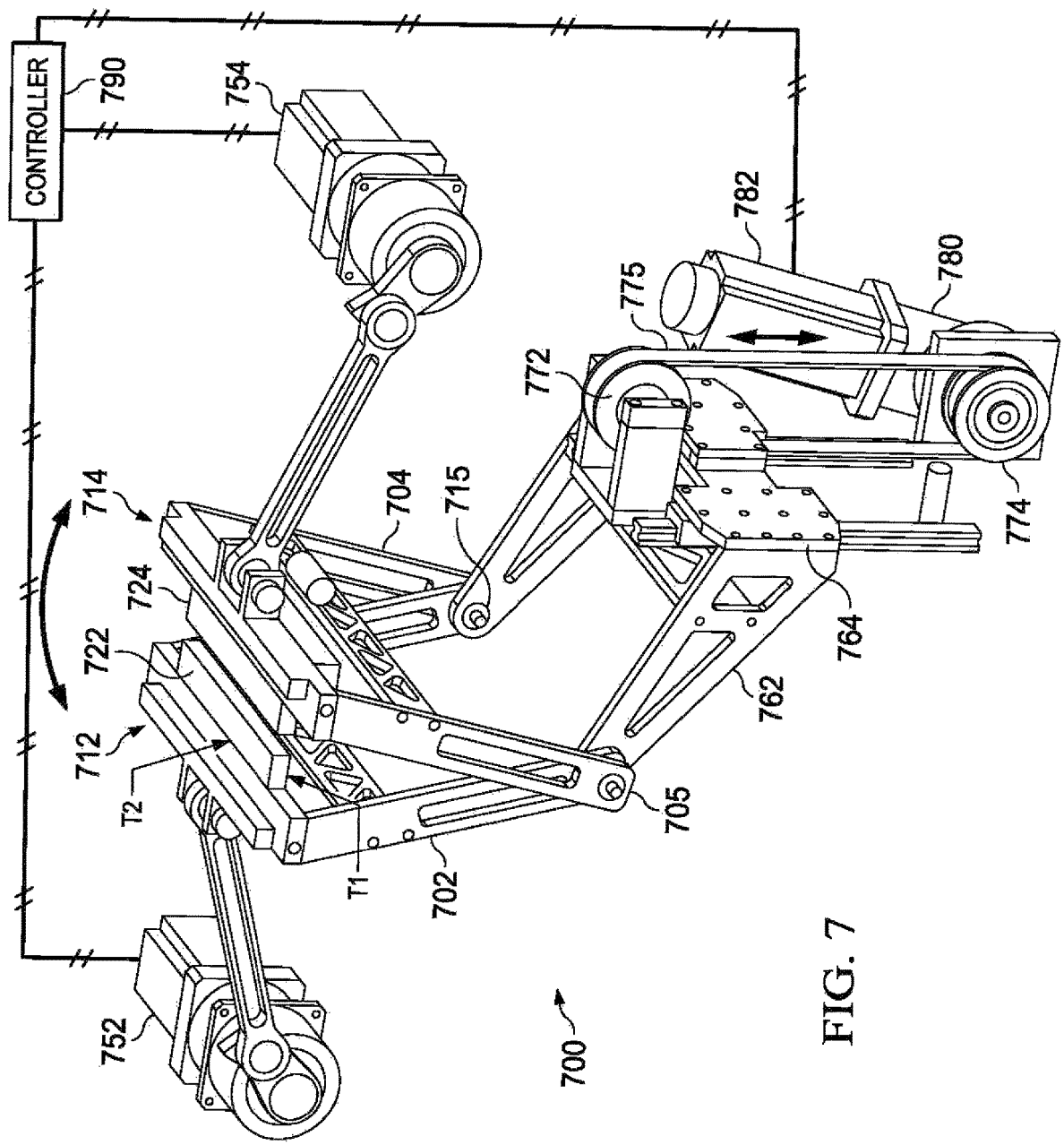
FIG. 7 is a perspective schematic depicting the v-shaped embodiment of FIG. 3 in greater detail.

FIG. 7 is a schematic representation, for illustrative purposes, of an exemplary embodiment of a flexible sealing jaw assembly 700 according to the invention. The flexible sealing jaws assembly 700 of this example has two laterally spaced apart v-shaped jaw pivot brackets 702, 704 each having a pair of scissor members. The scissor members are each pivotally coupled at the base of the "v" at pivot points 705, 715 respectively to form the v-shaped jaw pivot brackets. Thus, the two jaw pivot brackets are able pivot freely relative to each other, as shown by the double-headed arrow, until they are obstructed by spatial intrusion of other components of the assembly 700, or their travel is limited by controller 790, as explained below.

A sealing jaw 712 is mounted laterally along an upper horizontal extremity of v-shaped jaw pivot bracket 702, and likewise a sealing jaw 714 is mounted laterally along an upper horizontal extremity of u-shaped jaw pivot bracket 704. A heating element 722 is mounted to extend at least partially along an inboard side of sealing jaw 712. By inboard, we mean the side that would face the packaging film during operation of the sealing jaws, and as illustrated. Likewise, a heating element 724 is mounted to extend at least partially along an inboard side of sealing jaw 714. Thus, when the jaw pivot brackets 702, 704 close, by pivoting around 705 and 715, the heating elements 722, 724 will register with each other on opposite sides of the packaging film so that the heating elements would form a transverse seal.

A non-limiting and exemplary assembly of components for moving the sealing jaws in an up and down motion includes, in this example, u-shaped connecting bracket 762 having its ends coupled fixedly and non-pivotally to the pivot points 705, 715. Laterally-extending support bracket 764 is mounted to the base of the u-shaped bracket 762, to support a belt-and-pulley arrangement. A driven pulley 772 is mounted rotatably to the support bracket 762, and is driven by a belt 775, in this example a toothed belt, albeit that other belts may also be used. The toothed belt 775 engages a driving pulley 774 that is driven by a servomotor 782. Accordingly, as the driven pulley is rotated in clockwise or counter-clockwise direction, the toothed belt moves up or down as indicated by the arrow, thereby moving the assembly 700 up or down. Thus, the flexible sealing jaw assembly 700 can move freely in two dimensions, and its mass is supported by the drivers 754, 782, which are attached to structural framework, not shown in the drawings for purposes of clarity. Up and down motion may also be achieved, for example, by another form of vertical actuator attached to the pivot points 705, 715 and driven by a servomotor, as indicated schematically in FIG. 3.

As explained above, the servomotor drivers for the jaws 752, 754 and the driver for reciprocal motion 782 are controlled by a controller 790. This controller is pre-programmed with a plurality of different of loci of travel of the points T1 and T2, shown at the leading edges of heat elements 722, 724. Each of the plurality of loci correspond to a desired locus for a particular bag format to be formed on the VFFS. An operator can access the controller via a graphic user interface to select the desired locus or can select by bag format. As a result, the flexible sealing jaws are readily transitioned from one bag format (corresponding to one locus) to another bag format (corresponding to another locus), without need to replace the jaw assembly. In addition, VFFS apparatus dedicated to a particular format is no longer necessary, unless it is scheduled and in use full time in that format. Otherwise, such a VFFS apparatus can be retrofitted with the inventive flexible sealing jaws.

Figure 8:
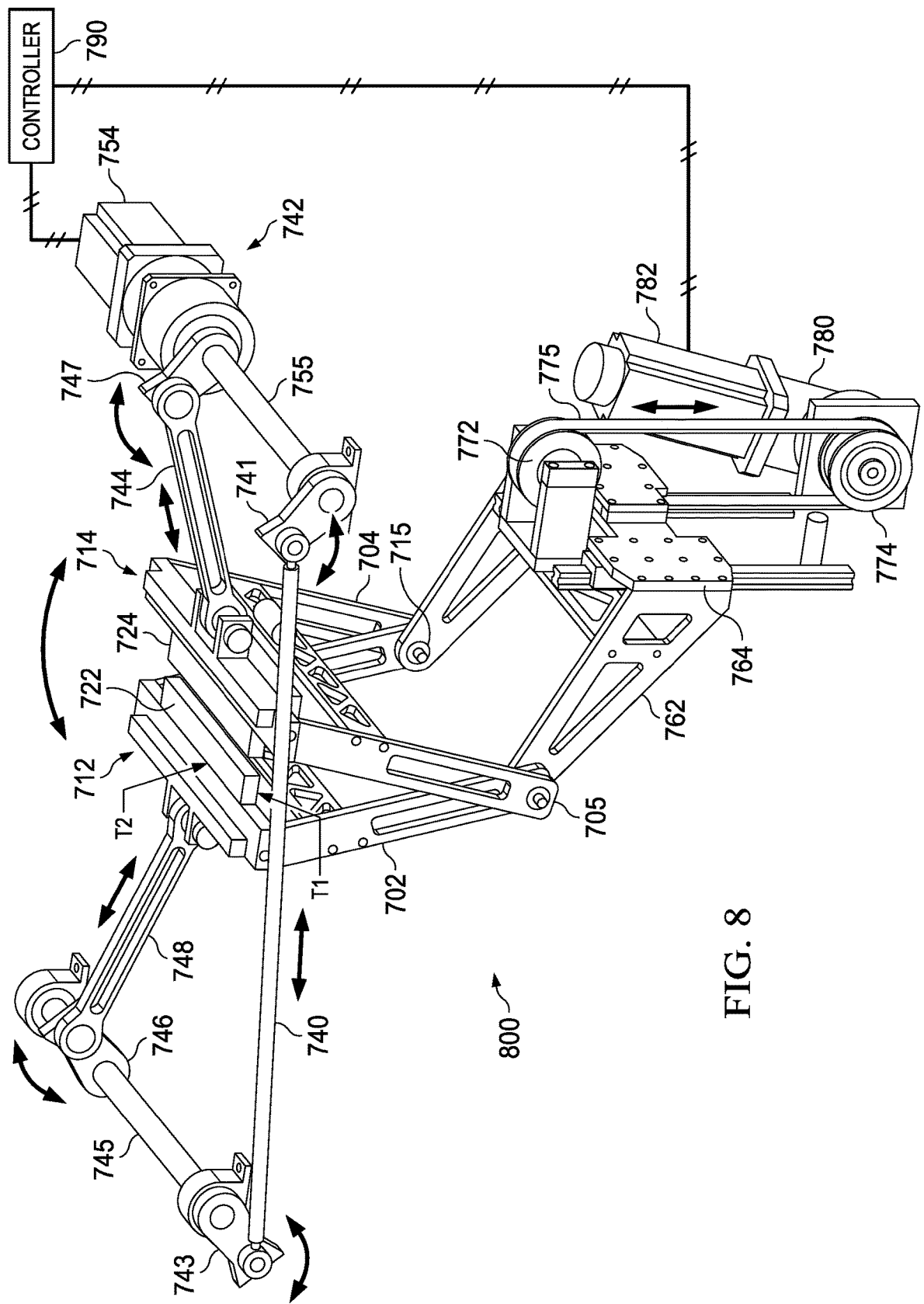
FIG. 8 is a perspective schematic depicting the v-shaped embodiment of FIG. 3 in greater detail.

FIG. 8 is a schematic illustration of an example of a flexible sealing jaw assembly 800 that has only a single driver 744 that opens and closes the jaws 712, 714. In this exemplary embodiment, a rotary driver 754 rotates a drive rod 755 to cause actuation of both jaws, via a rod and toggle type of mechanism. During operation, the rotation of rod 755 causes pivotable toggles 741 and 747 to rotate in concert. Motion of toggle 747 motivates opening and closing of jaw 714, by moving jaw lever 744 back and forth. Synchronously, rotation of drive rod 755 cause toggle 741 to move longitudinally extending reciprocating rod 740 back and forth and thereby drive toggle 743, mounted to laterally extending driven rod 745, in arcuate motion to cause driven rod 745 to rotate. Rotation of driven rod 745 in turn pivots toggle 746 thereby reciprocation jaw lever 748, causing the sealing jaws to open or close, depending upon direction of jaw lever 748 motion.

The controller 790 controls the rotary driver 754, both as to rate of rotation (speed) and extent of angular rotation. Thus, the rate of speed of jaw opening and closing, and the extent of opening are under control of controller 790 which controls driver 754, and hence drive rod 755. In the example shown, the vertical motion is imparted by the same mechanism of a driver, pulley and belt arrangement as described previously here above. Thus, the illustrated embodiment of flexible sealing jaws is enabled to move up and down while opening and closing the jaws.

In addition to the foregoing examples of FIGS. 7 and 8, other mechanisms may be devised, based on the disclosures herein, to create flexible sealing jaws for VFFS apparatus. Indeed, another example is depicted in FIG. 4.

With regard to the prior art box-mode, rotary and D-shape jaws, the inventive flexible sealing jaws provide several advantages. These include but are not limited to a lighter mass to move up and down as compared to the box-mode or the D-shaped mode jaws. This allows higher bag sealing rates while applying a high seal force. A lighter mass also potentially reduces repair downtime by placing less stress mechanically on the reciprocating (up and down) actuator assembly. Moreover, the box-mode jaws are relatively slower, typically limited to no more than about 120 bags/minute depending upon bag type. The inventive flexible sealing jaws, on the other hand, can operate at higher speeds thereby sealing more packages per minute, depending upon the type of bag. The inventive flexible sealing jaws can apply high seal pressures comparable to that of box-mode jaws, but the jaw assembly is much lighter. Moreover the range of motion of the inventive flexible sealing jaws is much greater thereby imparting greater flexibility as to bag format that can be produced. Indeed, the inventive flexible sealing jaws are useful with virtually any useful size and type of packaging, ranging from pillow bags to formatted bags. Rotary jaws are relatively limited to smaller bag sizes, and are restricted to pillow bags. While box-mode and D-shaped mode jaws can be used to make formatted bags and larger bags, they are slower than the inventive flexible sealing jaws. The inventive flexible sealing jaws have long seal dwell times, comparable to those of the box-mode and the D-shaped jaw mode.

While examples of embodiments of the technology have been presented and described in text and some examples also by way of illustration, it will be appreciated that various changes and modifications may be made in the described technology without departing from the scope of the inventions, which are set forth in, and only limited by, the scope of the appended patent claims, as properly interpreted and construed.

ADDITIONAL DISCLOSURE

The following clauses may be useful in a further understanding of the exemplary embodiments on the invention, and of the invention.

Clause 1 A vertical form fill and seal apparatus for packaging a particulate product, the vertical fill apparatus mounted to a structural frame, the vertical form fill and seal apparatus comprising:

a package sealing assembly having opposed sealing jaws coupled to each other around a common pivot point;

a first actuator fixedly attached to the structural frame, the first actuator mechanically coupled to the opposed sealing jaws to controlledly pivot the opposed sealing jaws about the common pivot point to open and close the opposed sealing jaws;

a second actuator fixedly attached to the structural frame, the second actuator mechanically coupled to the package sealing assembly and configured to controlledly reciprocate the package sealing assembly up and down; and a configurable controller controlling opening and closing of the sealing jaws by the first actuator and controlling the reciprocating by the second actuator thereby causing the jaws to describe a preset locus of travel;

whereby when in use, the first actuator operates the opposed sealing jaws to the seal package film transversely with the particulate product food therein, while the sealing jaws follow the preset locus of travel.

Clause 2. The form fill and seal apparatus of clause 1, wherein the first actuator is driven by a servomotor controlled by the controller.

Clause 3. The form fill and seal apparatus of clauses 1-2, wherein the second actuator is driven by a servomotor controlled by the controller.

Clause 4. The form fill and seal apparatus of clauses 1-3, wherein the second actuator is driven by a servomotor controlled by the controller.

Clause 5. The form fill and seal apparatus of clauses 1-4, wherein the first actuator is a hydraulic or pneumatic actuator under control of the controller and wherein the second actuator is a hydraulic or pneumatic actuator under control of the controller.

Clause 6. The form fill and seal apparatus of any preceding clause, wherein the first actuator is mechanically coupled to one of the opposed sealing jaws above the common pivot point, and the first actuator is coupled to another of the opposed sealing jaws below the common pivot point.

Clause 7. The form fill and seal apparatus of any preceding clause, wherein during motion of each of the opposed jaws, the preset locus of the jaw comprises a vertical velocity vector and a horizontal velocity vector.

Clause 8. The form fill and seal apparatus of any preceding clause, wherein the preset locus of travel of each of the opposed jaws is a mirror image of the preset locus of travel of the other jaw.

Clause 9. The form fill and seal apparatus of any preceding clause, wherein the controller is configured to control both a velocity of the first actuator and a velocity of the second actuator, as well as an extent of linear displacement of the first actuator and an extent of linear displacement of the second actuator.

Clause 10. The form fill and seal apparatus of any preceding clause, wherein a mass of the package sealing assembly is supported on the structural frame by the mounting of the first and second actuator to the structural frame.

Clause 11. The form fill and seal apparatus of any preceding clause, further comprising an additional first actuator, the first actuator coupled to one of the opposed sealing jaws and the additional first actuator coupled to another of the opposed sealing jaws.

Clause 12. The form fill and seal apparatus of clause 11, wherein the first actuator and the additional actuator are each driven by a separate servomotor, each servomotor controlled by the controller.

Clause 13 The form fill and seal apparatus of clause 12, wherein a maximum horizontal displacement of a point at a tip of each of the opposed jaws, and a maximum range of vertical displacement of the jaw assembly, trace an envelope within which the controller is configured to operate the opposed jaws such that a locus of the points at the tip configures the vertical fill form and seal apparatus for a selected one of multiple types of packaging, without change out of the sealing jaws.

Clause 14. The form fill and seal apparatus of any of preceding clauses 1-11, wherein the preset locus of travel of each of the opposed jaws is a mirror image elliptical of the preset locus of travel of the other, and the shape of the locus is preset by the controller based on a type of packaging to be formed on the vertical form fill and seal apparatus.

Clause 15. The form fill and seal apparatus of any preceding clause, wherein during operation, packaging film moves continuously through the apparatus, without intermittent stoppage, as the sealing jaws close to form a transverse seal in the packaging film.

Clause 16. A method of packaging a particulate product being packaged on a vertical form fill and seal apparatus, the method comprising the steps of:
providing a particulate product charge to the vertical form fill and seal apparatus for packaging;
feeding packaging film through the vertical form fill and seal apparatus;
side-sealing the packaging film with a longitudinal seal;
moving an assembly comprising pivotally connected and opposed sealing jaws of the vertical form fill and seal apparatus up and down under control of a controller while opening and closing the sealing jaws under control of the controller such that a locus of a point on each of the sealing jaws corresponds to a locus preset by a controller; and
transversely sealing packaging film with the sealing jaws by pivoting the sealing jaws toward each other, about a common pivot, on opposite sides of packaging film, to form a package.

Clause 17. The method of clause 16, wherein the step of moving an assembly comprises moving such that both an extent and a velocity of up and down motion is under control of the controller.

Clause 18. The method of clause 16-17, wherein the step of moving an assembly comprises moving such that both an extent and a velocity of opening and closing of the opposed sealing jaws is under control of the controller.

Clause 19. The method of clause 16-18, wherein the step of moving an assembly comprises moving such that the point on each sealing jaw describes a locus that is a mirror image of a locus described by the other jaw.

Clause 20. The method of clause 16-19, wherein the step of feeding of the packaging film is continuous and without interruption while transversely sealing.

The invention claimed is:
1. A vertical form fill and seal apparatus for packaging a particulate product, the vertical form fill and seal apparatus mounted to a structural frame, the vertical form fill and seal apparatus comprising:
  a package sealing assembly having sealing jaws comprising a first sealing jaw end and a second sealing jaw end opposed to the first;
  a first jaw pivot bracket comprising two first scissor members coupled to each other to form a v-shape, the first sealing jaw end mounted at an upper end of one of the two first scissor members, and the second sealing jaw end mounted at an upper end of another of the two first scissor members, a lower end of one of the two first scissor members adjacent to and pivotably coupled to a lower end of the other of the two first scissor members at a common first pivot point located at a tip of the v-shape;
  a second jaw pivot bracket comprising two second scissor members coupled to each other to form a v-shape, the first sealing jaw end mounted at an upper end of one of the two second scissor members, and the second sealing jaw end mounted at an upper end of another of the two second scissor members, a lower end of one of the two first scissor members adjacent to and pivotably coupled to a lower end of the other of the two first scissor members at a common second pivot point located at a tip of the v-shape, such that when scissor members of each respective jaw bracket pivot around their respective common pivot points, the first and second sealing jaws open and close;

a first actuator fixedly attached to the structural frame, the first actuator mechanically coupled to one of the jaw pivot brackets to controlledly pivot the scissor members thereof about the common pivot point;

a second actuator fixedly attached to the structural frame, the second actuator mechanically coupled to the package sealing assembly at the common first and second pivot points and configured to controlledly reciprocate the package sealing assembly up and down; and a configurable controller controlling opening and closing of the sealing jaws by the first actuator and controlling the reciprocating by the second actuator thereby causing each of the opposed first and second jaw ends to describe a respective preset locus of travel, the controller pre-programmed with a plurality of loci accessible by an operator, each locus corresponding to a bag format to be formed on the apparatus;

whereby when in use, the first actuator operates the opposed sealing jaw ends to seal the package film transversely with the particulate product therein, while the opposed sealing jaw ends each follows its respective preset locus of travel.

2. The vertical form fill and seal apparatus of claim 1, wherein the first actuator is driven by a servomotor controlled by the controller.

3. The vertical form fill and seal apparatus of claim 2, wherein the second actuator is driven by a servomotor controlled by the controller.

4. The vertical form fill and seal apparatus of claim 1, wherein the second actuator is driven by a servomotor controlled by the controller.

5. The vertical form fill and seal apparatus of claim 1, wherein the first actuator is a hydraulic or pneumatic actuator under control of the controller and wherein the second actuator is a hydraulic or pneumatic actuator under control of the controller.

6. The vertical form fill and seal apparatus of claim 1, wherein the first actuator is mechanically coupled to the first jaw pivot bracket above the first common pivot point, and the first actuator is coupled to the second jaw pivot bracket below the first common pivot point.

7. The vertical form fill and seal apparatus of claim 1, wherein during motion of each of the scissor members, the preset locus of the sealing jaw ends comprises a vertical velocity vector and a horizontal velocity vector.

8. The vertical form fill and seal apparatus of claim 1, wherein the preset locus of travel of each of the sealing jaw ends is a mirror image of the preset locus of travel of the other sealing jaw end.

9. The vertical form fill and seal apparatus of claim 1, wherein the controller is configured to control both a velocity of the first actuator and a velocity of the second actuator, as well as an extent of linear displacement of the first actuator and an extent of linear displacement of the second actuator.

10. The vertical form fill and seal apparatus of claim 1, wherein a mass of the package sealing assembly is supported on the structural frame by the mounting of the first and second actuator to the structural frame.

11. The vertical form fill and seal apparatus of claim 1, further comprising an additional first actuator, the additional first actuator coupled to the first jaw pivot bracket and to the second jaw pivot bracket.

12. The vertical form fill and seal apparatus of claim 11, wherein the first actuator and the additional actuator are each driven by a separate servomotor, each servomotor controlled by the controller.

13. The vertical form fill and seal apparatus of claim 12, wherein a maximum horizontal displacement of a point at a tip of each of the opposed jaw ends, and a maximum range of vertical displacement of the jaw assembly, trace an envelope within which the controller is configured to operate the opposed jaw ends such that a locus of the points at the tips configures the vertical fill form and seal apparatus for a selected one of multiple types of packaging, without change out of the sealing jaw.

14. The vertical form fill and seal apparatus of claim 1, wherein the preset locus of travel of each of the opposed jaw ends is a mirror image of the preset elliptical locus of travel of the other jaw end, and a shape of the locus is preset by the controller based on a type of packaging to be formed on the vertical fill form and seal apparatus.

15. The vertical form fill and seal apparatus of claim 1, wherein during operation, packaging film moves continuously through the apparatus, without intermittent stoppage, as the sealing jaws close to form a transverse seal in the packaging film.

16. The vertical form fill and seal apparatus of claim 1, wherein the second actuator includes a belt and pulley arrangement driven by a servomotor.

17. The vertical form fill and seal apparatus of claim 1, further comprising a pulley driven by the second actuator so that as the pulley is rotated in clockwise and counterclockwise directions, the package sealing assembly reciprocates.

18. The vertical form fill and seal apparatus of claim 1, further comprising a drive rod rotated by a rotary driver, the drive rod rotating pivotable toggles in concert to urge the seal jaws to open and close.

19. The vertical form fill and seal apparatus of claim 1, further comprising another actuator, the first actuator driving one of the opposed seal jaw ends and the another actuator driving another of the opposed seal jaw ends.

20. The vertical form fill and seal apparatus of claim 1, further comprising another actuator, the first actuator coupled to the first jaw pivot bracket above the first common pivot point, and driving the one opposed seal jaw end, and the another actuator coupled to the second jaw pivot bracket above the common first pivot point, and driving the another opposed seal jaw.

* * * * *